(12) United States Patent
Elliott et al.

(10) Patent No.: US 10,378,309 B2
(45) Date of Patent: Aug. 13, 2019

(54) CHOKE VALVE TRIM

(71) Applicant: Cameron International Corporation, Houston, TX (US)

(72) Inventors: Declan Elliott, Longford (IE); Michael Anthony McKeon, Longford (IE)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 14/586,353

(22) Filed: Dec. 30, 2014

(65) Prior Publication Data

US 2016/0186526 A1 Jun. 30, 2016

(51) Int. Cl.
| | |
|---|---|
| E21B 34/02 | (2006.01) |
| F16K 1/32 | (2006.01) |
| F16K 3/30 | (2006.01) |
| E21B 43/12 | (2006.01) |

(52) U.S. Cl.
CPC .............. *E21B 34/02* (2013.01); *E21B 43/12* (2013.01); *F16K 1/32* (2013.01); *F16K 3/30* (2013.01)

(58) Field of Classification Search
CPC ............... E21B 34/02; F16K 1/32; F16K 3/30
USPC ........................................................ 166/377
See application file for complete search history.

(56) References Cited

U.S. PATENT DOCUMENTS

| | | | |
|---|---|---|---|
| 3,336,947 A | 8/1967 | Boggs | |
| 6,082,458 A | 7/2000 | Schnatzmeyer | |
| 2011/0315369 A1* | 12/2011 | Holderman | E21B 19/16 166/77.51 |
| 2012/0174993 A1* | 7/2012 | McHugh | E21B 34/04 137/511 |
| 2012/0181470 A1* | 7/2012 | King | E21B 21/106 251/333 |
| 2013/0256570 A1 | 10/2013 | McHugh et al. | |
| 2014/0262333 A1* | 9/2014 | Frenzel | E21B 34/02 166/378 |

FOREIGN PATENT DOCUMENTS

| | | |
|---|---|---|
| EP | 0893575 A2 | 1/1999 |
| GB | 2122314 A | 1/1984 |

OTHER PUBLICATIONS

PCT International Search Report and Written Opinion for Application No. PCT/US2015/064558 dated May 17, 2016, 14 pages.

* cited by examiner

*Primary Examiner* — Anna M Momper
*Assistant Examiner* — Patrick F Lambe
(74) *Attorney, Agent, or Firm* — Fletcher Yoder, P.C.

(57) ABSTRACT

Embodiments of the present disclosure are directed toward a choke valve system including a choke valve body and a plurality of choke trims. The plurality of choke trims comprises a plug and cage choke trim, an external sleeve choke trim, and a drilling choke trim, wherein the drilling choke trim is configured to enable a fluid flow rate greater than the plug and cage choke trim and the external sleeve choke trim, and wherein each of the plurality of choke trims is configured to be mutually exclusively secured within the choke valve body.

25 Claims, 5 Drawing Sheets

CHOKE VALVE TRIM

FIELD OF THE PRESENT DISCLOSURE

Embodiments of the present disclosure relate generally to valves. More particularly, some embodiments of the present disclosure relate to choke valves and choke valve trims for a mineral extraction system.

BACKGROUND

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

In many fluid-handling systems, it is useful to adjust a fluid's flow rate. Often, fluids (e.g., a liquid, a gas, or combination thereof) enter the system at a relatively high pressure before flowing to lower pressure regions of the system. The flow rate driven by the resulting pressure drop may be greater than desired. High flow rates may erode components, generate unpleasant noise, and deliver greater volumes of fluid than downstream components are equipped to optimally process.

To adjust flow rates, many fluid-handling systems include choke valves. These valves typically include a choke body with a movable valve member (e.g., a choke trim) disposed therein. The choke trim translates over an opening of the choke body through which the fluid flows. By shifting the position of the choke trim, or a component of the choke trim relative to the opening, the size of the opening may be increased or decreased, and the flow rate of the fluid may be adjusted. In some types of choke valves, the choke trim can close the opening and seal against a seat, thereby dropping the flow rate to zero or near zero and closing the choke valve. Various types of choke trims exist for use in various applications and operating conditions of the fluid-handling system. Unfortunately, different styles of choke trims usually require different choke bodies.

DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof.

Embodiments of the present disclosure are directed towards fluid-handling systems, such as a fluid-handling system for a mineral extraction system, including choke valves having a choke body and a plurality of choke trims configured to be disposed within the choke body. More specifically, the plurality of choke trims may include different styles and types of choke trims, such as drilling choke trims, production choke trims, etc. For example, the plurality of choke trims may include a clean-up trim, a plug and cage trim, a floating sleeve trim, and so forth. As discussed in detail below, each of the plurality choke trims is configured to be mutually exclusively and selectively disposed within the same choke body. For example, the choke body may be a production choke body. That is, the choke body may be a choke body configured for use during production of a fluid or gas (e.g., from a mineral formation). The ability to interchange each of the plurality of choke trims with a single choke body provides increased flexibility to change a style of choke trim depending on flow condition without also changing the entire choke assembly (e.g., the choke body). As a result, the amount of inventory (e.g., component inventory) that is held by an operator may be reduced, operating costs may be reduced, drilling, clean-up, and production operations may be streamlined, and so forth.

Figure 1:
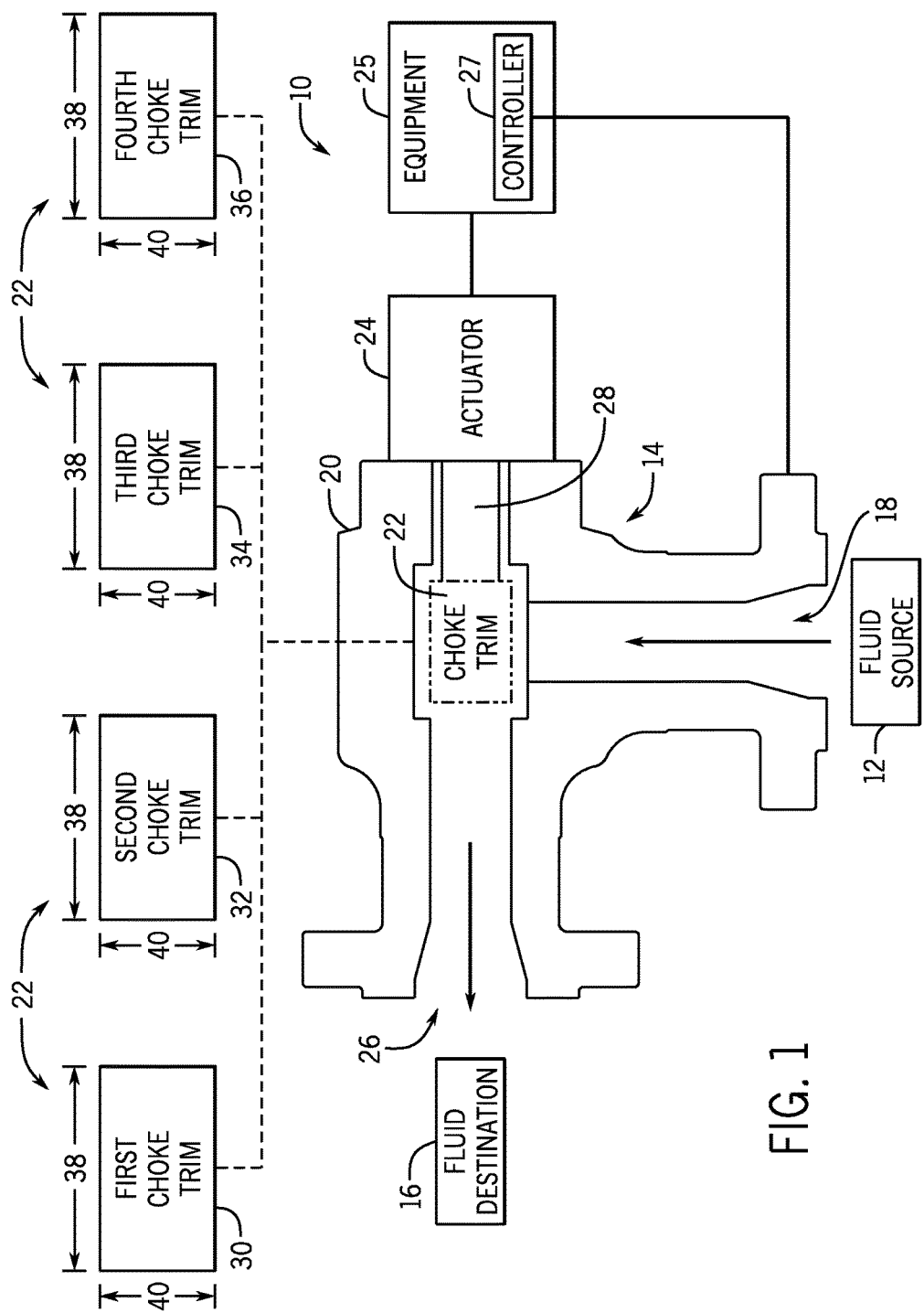
FIG. 1 is a schematic of a fluid-handling system including a choke valve, illustrating a plurality of choke trims that may be used with a single choke body, in accordance with an embodiment of the present disclosure.

FIG. 1 illustrates an embodiment of a fluid-handling system 10. The fluid-handling system 10 may be part of an energy-acquisition or processing system, e.g., a hydrocarbon-production or processing system, such as a subsea or surface oil or gas well. In some embodiments, the fluid-handling system 10 may be a gas-uplift system, a water-injection system, a water/steam/chemicals injection system, or other system for conveying fluids. The fluid-handling system 10 includes a fluid source 12, a choke valve 14, and a fluid destination 16. The fluid source 12 may include a variety of fluid sources, such as an oil or natural gas well. The fluid source 12 may supply a variety of fluids, such as air, natural gas, oil, water (steam or liquid), or combinations thereof. The fluid arriving from the source 12 may be at relatively high pressures, e.g., pressures greater than 500 psi, 1000 psi, 5000 psi, or 10,000 psi. Additionally, the pressure of the fluid arriving from the source 12 may be higher than the pressure of the fluid destination 16.

The choke valve 14 includes an inlet 18, a choke body 20 (e.g., a production choke body and/or a universal choke body), a choke trim 22 disposed within the choke body 20, an actuator 24, and a fluid outlet 26. The actuator 24 may modulate flow between the inlet 18 and the outlet 26 by adjusting the position of the choke trim 22 or a component of the choke trim 22. For example, the actuator 24 may be a manual actuator (e.g., a wheel), an electro-mechanical actuator, a hydraulic actuator, or other suitable type of actuator. To adjust the position of the choke trim 22 or a component of the choke trim 22 (e.g., a plug), the actuator 24 may exert a translation force on a shaft 28 coupled to the actuator 24 and the choke trim 22 or the component of the choke trim 22.

As mentioned above, the choke trim 22 may be one of a plurality of choke trims 22. For example, the plurality of choke trims 22 may include a first choke trim 30, a second choke trim 32, a third choke trim 34, and a fourth choke trim 36. Each of the first, second, third, and fourth choke trims 30, 32, 34, and 36 may be a different style or type. For example, the first choke trim 30 may be a drilling choke trim (e.g., a clean-up or anti-blockage trim), the second choke trim 32 may be a first type of production choke trim (e.g., a plug and cage or high capacity choke trim), the third choke trim 34 may be a second type of production choke trim (e.g., an external sleeve or low capacity choke trim), and the fourth choke trim 36 may be another type of choke trim. As discussed in detail below, the various choke trims 22 may have different qualities, characteristics, or features that enable their use in different situations. For example, the first choke trim 30 (e.g., the drilling choke trim) may be suitable for use during a mineral well clean-up process, and the second and third choke trims 32 and 34 (e.g., the production choke trims) may be suitable for use during a mineral production process. In certain embodiments, the third choke trim 34 (e.g., the external sleeve choke trim) may be suitable for early well life erosive servicing due to sand.

As each of the plurality of choke trims 22 may be individually (e.g., mutually exclusively and/or selectively) disposed within the choke body 20, the choke trims 22 may be readily changed out and/or exchanged depending on a stage process of a mineral extraction operation. More importantly, the choke trims 22 may be readily changed out and/or exchanged without changing out or exchanging the choke body 20 and other components of the fluid-handling system 10. For example, the first choke trim 30 (e.g., the drilling choke trim) may be positioned within the choke body 20 to complete a well drilling process. Thereafter, the first choke trim 30 may be changed out for the second choke trim 32 or the third choke trim 34 (e.g., the production choke trims) once the drilling process is complete and in anticipation of a mineral production process. As will be appreciated, during the production process, it may be desirable to perform additional well clean-up or other process (e.g., fracking) utilizing the first choke trim 30 (e.g., the drilling choke trim). In such circumstances, the second choke trim 32 or the third choke trim 34 (e.g., the production choke trims) may be changed out for the first choke trim 30 (e.g., the drilling choke trim) for completion of additional clean-up or fracking of the well without removing and changing out the choke body 20 and other components of the choke valve 14.

To enable interchangeability of the plurality of choke trims 22 with the same choke body 20, each of the plurality of choke trims 22 may have similar geometries, dimensions, and other physical features to enable securement and proper operation of each of the plurality of choke trims 22 within the choke body 20. For example, each of the choke trims 22 may have a length 38 and a diameter 40. The lengths 38 and/or diameters 40 of each choke trim 22 may be similar or substantially identical. For example, the length 38 and/or diameter 40 dimensions of each choke trim 22 may be within approximately 1 to 10, 2 to 8, 3 to 6, or 4 to 5 percent of one another. As a result, each of the choke trims 22 will similarly fit within the choke body 20. Each of the plurality of choke trims 22 may also have other similarly shared features, such as load shoulders, seats, seals, and so forth. Additionally, each of the plurality of choke trims 22 may be configured to be positioned within the choke body 20 in a similar manner. For example, each of the plurality of choke trims 22 may be configured to be positioned and/or retained within the choke body 20 via a linear (e.g., non-rotational) force.

As will be appreciated, additional equipment 25 may be coupled to the fluid-handling system 10 (e.g., the choke valve 14 and/or the actuator 24). For example, in embodiments where the first choke trim 30 (e.g., the drilling choke trim) is positioned within the choke body 20, the equipment coupled to the fluid-handling system 10 may including drilling equipment or fracking equipment. Similarly, in embodiments where the second choke trim 32 or third choke trim 34 (e.g., the productions choke trims) is positioned within the choke body 20, the equipment coupled to the fluid-handling system 10 may including production equipment. In certain embodiments, the additional equipment 25 may include a controller 27 configured to regulate operation of the actuator 24 based on the type of choke trim 22 positioned within the choke body 20, based on the type of additional equipment 25 being used, based on operating conditions of the fluid-handling system 10 (e.g., a fluid flow rate through the choke valve 14), and so forth.

Figure 2:
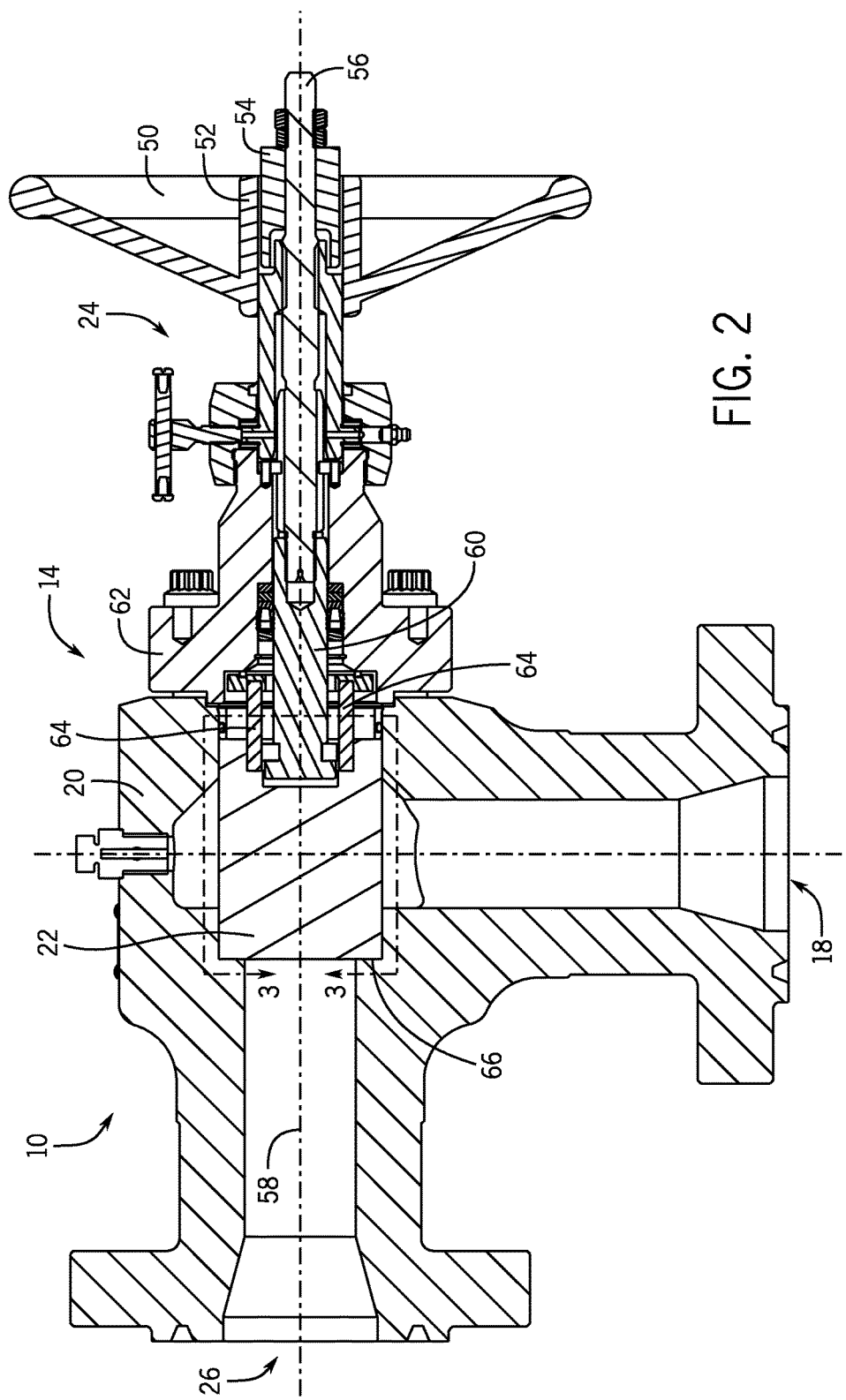
FIG. 2 is a cross-sectional side view of a choke valve, illustrating a choke trim disposed within a choke body of the choke valve, in accordance with an embodiment of the present disclosure.

FIG. 2 is a cross-sectional side view of an embodiment of the fluid-handling system 10, illustrating the choke valve 14 with one of the plurality of choke trims 22 disposed within the choke body 20 of the choke valve 14. The choke trim 22 may be the first choke trim 30 (e.g., a drilling or clean-up trim), the second choke trim 32 (e.g., a plug and cage or high capacity production choke trim), the third choke trim 34 (e.g., an external sleeve or low capacity production choke trim), or the fourth choke trim 36 (e.g., a silencer or labyrinth choke trim).

In the illustrated embodiment, the actuator 24 is a manual actuator that includes a wheel 50 with a hub 52, a threaded bushing 54, and a threaded shaft 56 (e.g., upper stem). Each of these components 50, 52, 54, and 56 may be generally coaxial with an outlet axis 58 of the choke valve 14. The wheel 50 is configured to rotate about the outlet axis 58, thereby driving engagement of the threaded bushing 54 and axially pushing or pulling the shaft 56. As mentioned above, other embodiments may include other types of actuators 24, e.g., an electric actuator, a hydraulic actuator, or a pneumatic actuator. The shaft 56 may couple to the choke trim 22 and move the choke trim 22 as the wheel 50 is rotated. Specifically, the shaft 56 is coupled to the choke trim 22 via a lower stem 60, which is held in place by a bonnet 62 coupled to the choke body 20. Rotational motion of the wheel 50 is transferred to the lower stem 60 via the shaft 56. In certain embodiments, the lower stem 60 may convert the rotational motion of the shaft 56 into linear motion to enable linear movement of the choke trim 22 within the choke body 20. Additionally, the lower stem 60 may be rotated within the bonnet 62 to allow linear movement of the stem 60. In this manner, the choke trim 22 may be linearly positioned within (e.g., "dropped into") the choke body 20. As such, the choke trim 22 and the choke body 20 may not be engaged via threads. Indeed, as each of the plurality of choke trims 22 described herein are configured to be individually retained within the same choke body 20, each of the plurality of trims 22 may be configured to be linearly positioned within (e.g., "dropped into") the choke body 20. In other words, each of the plurality of choke trims 22 may not engage with the choke body 20 via threads.

The bonnet 62 may also hold other components of the choke trim 14 in place. For example, the bonnet 62 may support retaining features of the choke trim 14 that are configured to secure the choke trim 22 in place within the choke body 20. In the illustrated embodiment, the bonnet 62 secures retaining pins 64 (e.g., retaining elements) against the choke trim 22 to retain the choke trim 22 within the choke body 20. As will be appreciated, for certain choke trims 22 of the plurality of choke trims 22, the illustrated retaining features (e.g., the retaining pins 64) may be omitted or exchanged for alternative retaining features while still utilizing the same bonnet 62 and choke body 20 to individually secure each of the plurality of choke trims 22 within the choke body 20.

In the illustrated embodiment, the choke trim 22 is retained within the choke body 20 against a choke trim seat recess 66 (e.g., annular seat recess) of the choke body 20. As mentioned above, each of the plurality of choke trims 22 illustrated is configured to be individually (e.g., mutually exclusively and/or selectively) retained within the choke body 20 without threading into the choke body 20. Accordingly, as described in detail below, each of the plurality of choke trims 22 may have a similar geometry or structure configured to mate with the choke trim seat recess 66 of the choke body 20.

Figure 3:
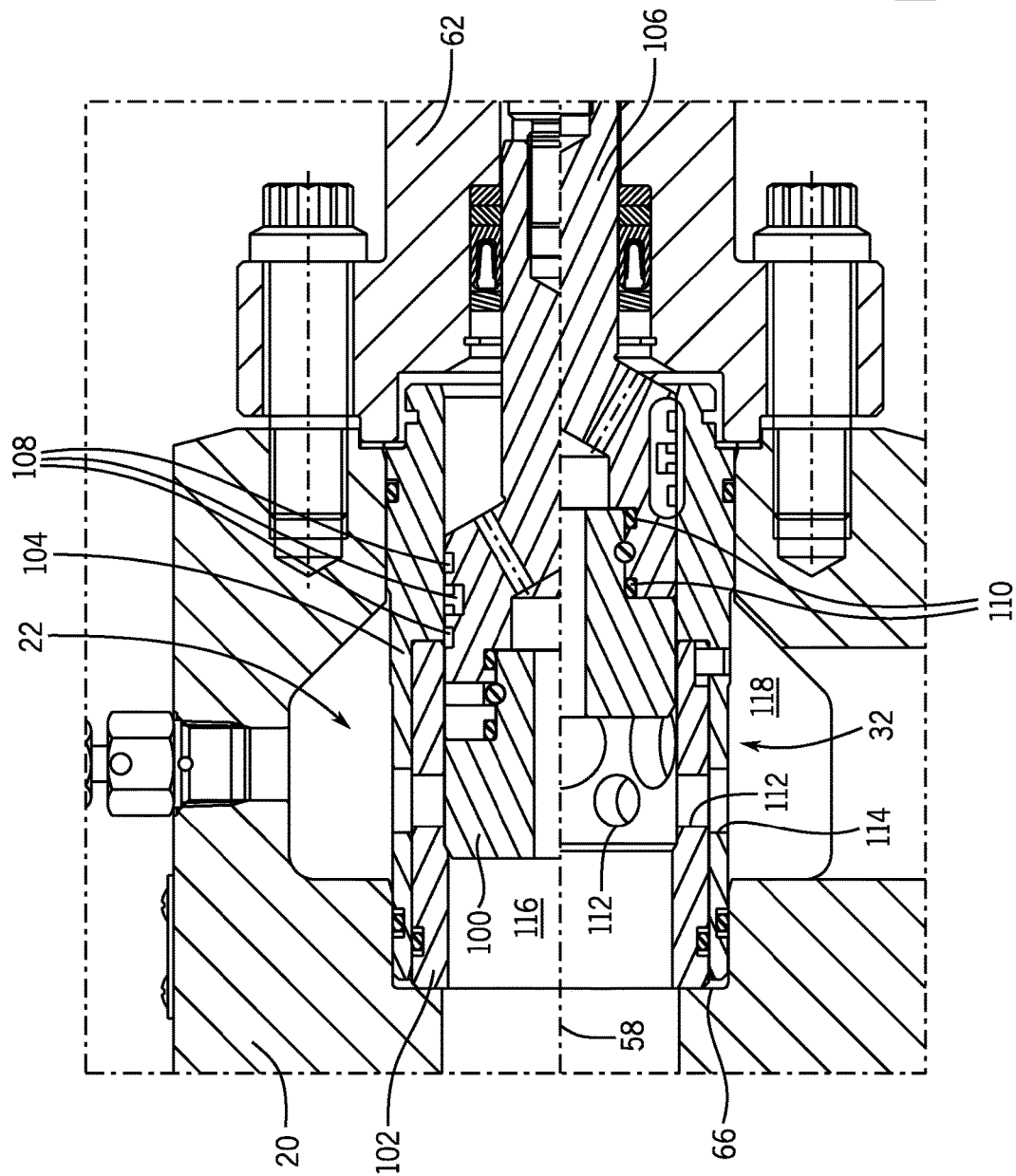
FIG. 3 is a cross-sectional side view of an embodiment of a choke trim (e.g., a plug and cage type choke trim) which may be disposed with the choke body, in accordance with an embodiment of the present disclosure.
Figure 4:
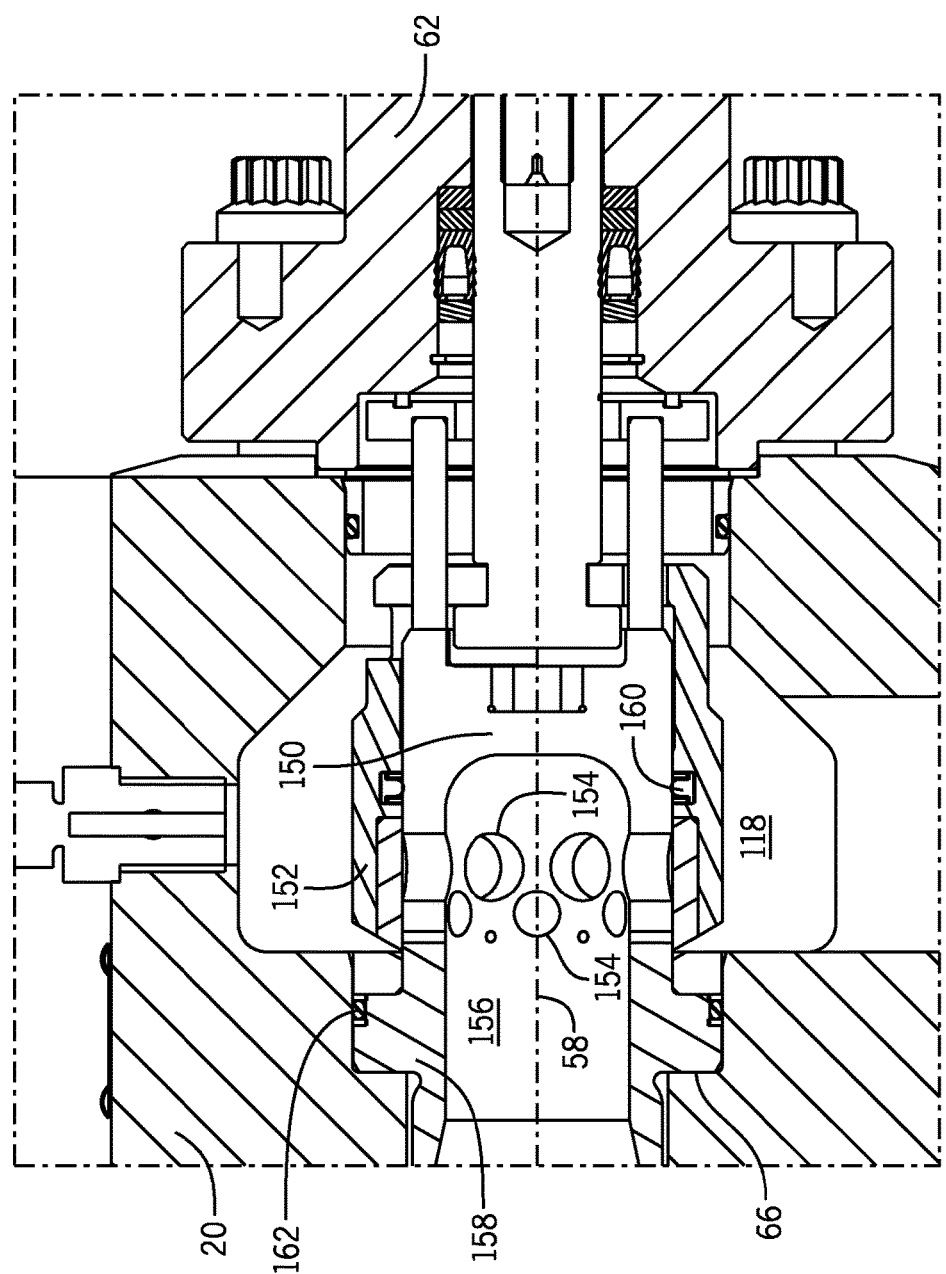
FIG. 4 is a cross-sectional side view of an embodiment of a choke trim (e.g., a floating or external sleeve type choke trim) which may be disposed with the choke body, in accordance with an embodiment of the present disclosure.
Figure 5:
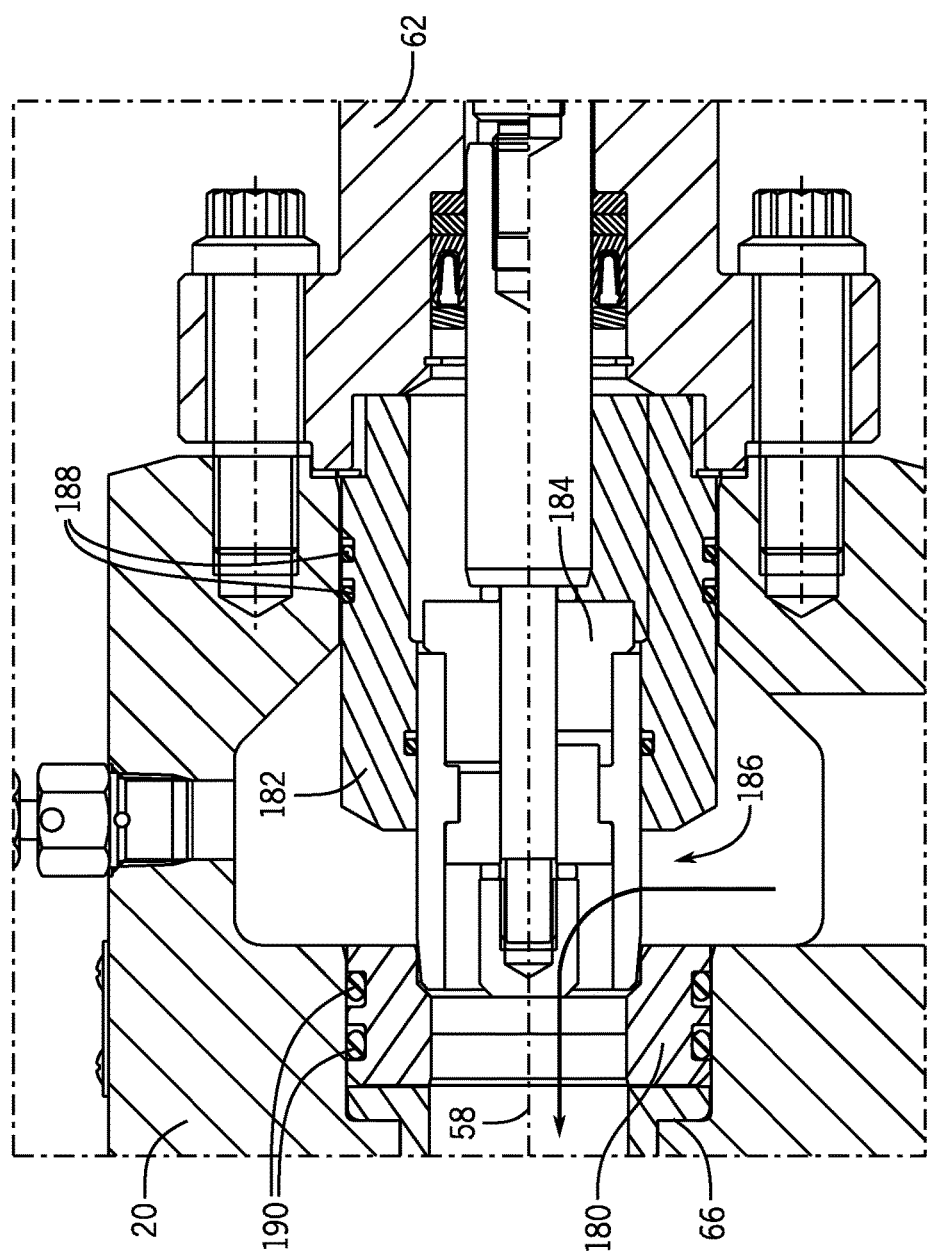
FIG. 5 is a cross-sectional side view of an embodiment of a choke trim (e.g., a drilling, clean-up, or anti-blockage type choke trim) which may be disposed with the choke body, in accordance with an embodiment of the present disclosure.

FIGS. 3-5 are cross-sectional side views of various embodiments of the choke trim 22. In other words, each of the choke trims 22 shown in FIGS. 3-5 may be one of the plurality of choke trims 22 that may be secured within the choke body 20. More specifically, FIG. 3 is a cross-sectional side view of the second choke trim 32 (e.g., a plug and cage or high capacity production choke trim), FIG. 4 is a cross-sectional side view of the third choke trim 34 (e.g., an external sleeve or low capacity production choke trim), and FIG. 5 is a cross-sectional side view of the first choke trim 30 (e.g., a drilling or clean-up trim).

The second choke trim 32 disposed within the choke body 20, as shown in FIG. 3, is a plug and cage style choke trim. That is, the second choke trim 32 is a high capacity, production choke trim configured for use during high fluid flow within the choke valve 14. For example, the second choke trim 32 may be used within the choke valve 14 during the production of oil or other liquid from a mineral formation. FIG. 3 illustrates a split view of the choke trim 22 that is divided along the outlet axis 58. The portion of the choke trim 22 above the outlet axis 58 is in the fully-closed position, and the portion of the choke trim 22 below the outlet axis 58 is in the fully-open position. As discussed above, the actuator 24 may modulate flow through the choke valve 14 by adjusting the position of one or more components of the choke trim 22.

The second choke trim 32 includes a plug 100 (e.g., a valve member) disposed within inner and outer cages (e.g., throttling members and/or annular throttling members) 102 and 104. The plug 100 may be made of tungsten carbide or other appropriate erosion resistant materials. In some embodiments, the plug 100 or other components of the choke valve 14 may include materials of lesser erosion resistance that are coated with erosion resistant materials, such as tungsten carbide or a diamond-type coating material.

The plug 100 is coupled to a shaft 106, which may be further coupled to the lower stem 60 described above. In certain embodiments, the shaft 106 is coupled to the plug 100 via a threaded connection. The shaft 106 also includes seals 108 (e.g., annular seals) disposed between the shaft 106 and the inner and outer cages (e.g., throttling members) 102 and 104 disposed about the plug 100. The seals 108 may be configured to enable a sliding engagement between the shaft 106 and the inner and outer cages 102 and 104. The shaft 106 further includes seals 110 (e.g., static seals) disposed between the shaft 106 and the plug 100. The seals 108 and 110 may be made of elastomers or other appropriate materials.

As mentioned above, the second choke trim 32 includes inner and outer cages 102 and 104. The inner and outer cages 102 and 104 may be made of tungsten carbide or other appropriate erosion resistant materials. As shown, the inner and outer cages 102 and 104 are seated within the choke trim seat recess 66 of the choke body 22. As such, the one or both of the inner and outer cages 102 and 104 may be dimensioned or sized to appropriately fit with the choke trim seat recess 66 of the choke body 20 to enable retention of the second choke trim 32 within the choke body 20.

The inner and outer cages 102 and 104 each include a plurality of openings 112 and 114, respectively. The openings 112 and 114 are generally coaxial with each other and extend generally radially from the outlet axis 58 at different positions about the outlet axis 58. As shown, the openings 112 and 114 may be sized to enable high capacity fluid flows (e.g., liquid fluid flow) through the choke trim 22. For example, the openings 112 and 114 may be larger or smaller than similar openings of other styles of choke trims 22 discussed below.

The openings 112 and 114 place an interior 116 of the choke trim 22 in fluid communication with a gallery 118 when the choke valve 14 is open. As such, when the choke valve 14 is open, fluid may flow from the inlet 18, through the second choke trim 32, and toward the outlet 26 of the choke valve 14. However, flow may be impeded through the second choke trim 32 by varying the position of the plug 100 within the inner and outer cages 102 and 104. Specifically, in operation, flow through the choke valve 14 is adjusted by manipulating the actuator 24. For example, as explained above, rotating the wheel 50 causes the shaft 56 to translate axially, along the outlet axis 58. This movement drives the plug 100 between the fully-open and fully-closed positions illustrated in FIG. 3, thereby blocking or exposing the openings 112 and 114 to the flow. As will be appreciated, the flow rate through the choke valve 14 depends on the position of the plug 100. The openings 112 and 114 may be partially or substantially entirely obstructed by the plug 100, thereby impeding a portion or all of the flow.

As mentioned above, FIG. 4 is a cross-sectional side view of the third choke trim 34. Specifically, the third choke trim 34 shown in FIG. 4 is a low capacity production choke trim configured for use during lower fluid flow within the choke valve 14. For example, the third choke trim 34 may be used within the choke valve 14 during the production of natural gas or other gas from a mineral formation. Additionally, the third choke trim is suitable for use in sand erosion servicing.

The third choke trim 34 includes an inner cage 150 and an external sleeve 152 (e.g., a cage guided sleeve and/or annular sleeve) disposed about the inner cage 150. The inner cage 150 includes a plurality of openings 154. The openings 154 extend generally radially from the outlet axis 58 at different positions about the outlet axis 58. As shown, the openings 154 may be sized to enable lower capacity fluid flows (e.g., gaseous fluid flow) through the choke trim 22. For example, the openings 154 may be smaller than the openings 112 and 114 of the second choke trim 32 discussed above. The openings 154 place an interior 156 of the choke trim in fluid communication with the gallery 118 when the choke valve 14 is open.

During operation, one or more of the openings 154 may be blocked by the external sleeve 152, depending on the position of the external sleeve 152 relative to the openings 154. In certain embodiments, the external sleeve 152 may be a floating external sleeve configured to freely translate axially along the inner cage 150. As will be appreciated, the floating configuration of the external sleeve 152 may also allow for machining tolerances and misalignment of the third choke trim 34 within the choke body 20. The external sleeve 152 further includes a seat portion 158 configured to be retained within the choke trim seat recess 66 of the choke body 20. As similarly described above, the seat portion 158 of the external sleeve 152 may be dimensioned or sized to appropriately fit with the choke trim seat recess 66 of the choke body 20 to enable retention of the third choke trim 34 within the choke body 20.

As shown, the third choke trim 34 may include other features, such as seals 160 (e.g., annular seals) disposed between the inner cage 150 and the external sleeve 152. Similarly, the third choke trim 34 may include seals 162 (e.g., annular seals) disposed between the seat portion 158 and the choke trim seat recess 66 of the choke body 20. Furthermore, as mentioned above, the third choke trim 34 may also have a "drop in" design. That is, the third choke trim 34 may also be configured to be linearly positioned within the choke body 20, such that the third choke trim 34 is not engaged with the choke body 20 via threads. Instead, in the illustrated embodiment, the third choke trim 34 is positioned within the choke body 20 by a linear force, and the third choke trim 34 is retained within the choke body 20 between the choke trim seat recess 66 and the bonnet 62.

FIG. 5 is a cross-sectional side view of the first choke trim 30. As mentioned above, the first choke trim 30 is a drilling choke trim or a well clean-up choke trim. As such, the first choke trim 30 is more blockage resistant than the second choke trim 32 and the third choke trim 34. To this end, the first choke trim 30 includes a choke trim seat 180 (e.g., annular seat) and an outer sleeve 182 (e.g., annular sleeve) disposed about an inner member 184. As shown, the components of the first choke trim 30 create an opening 186 through which a fluid may pass through the first choke trim 30. The opening 186 may be larger than the openings 112 and 114 of the second choke trim 32 and the openings 154 of the third choke trim 34, hence the increased flow (e.g., reduction in blockage) enabled by the first choke trim 30. In certain embodiments, the opening 186 of the first choke trim 30 may enable 5, 10, 15, 20, 25, 30, 35, 40 percent or more flow than the second choke trim 32 or the third choke trim 34. As such, the first choke trim 30 may be suitable for drilling operations, well clean-up operations, fracking operations, and so forth. For example, the first choke trim 30 may be less susceptible to blockage, erosion, or physical damage during such operations compared to the second choke trim 32 and the third choke trim 34.

As shown, the first choke trim 30 is retained within the choke body 20 between the choke trim seat recess 66 and the bonnet 62. To this end, the first choke trim 30 may be dimensioned or sized to fit within the choke body 20 such that the first choke trim 30 is suitably retained between the choke trim seat recess 66 and the bonnet 62. However, in other embodiments, additional retaining features (e.g., retaining pins) may also be used to secure the first choke trim 30 within the choke body 20.

As shown, the first choke trim 30 may include other features, such as seals 188 (e.g., annular seals) disposed between the outer sleeve 182 (e.g., annular sleeve) and choke body 20. Similarly, the first choke trim 30 may include seals 190 disposed between the choke trim seat 130 and the choke trim seat recess 66 of the choke body 20. Furthermore, as mentioned above, the first choke trim 30 may also have a "drop in" design. That is, the first choke trim 30 may also be configured to be linearly positioned within the choke body 20, such that the first choke trim 30 is not engaged with the choke body 20 via threads. Instead, in the illustrated embodiment, the first choke trim 30 is positioned within the choke body 20 by a linear force, and the first choke trim 30 is retained within the choke body 20 between the choke trim seat recess 66 and the bonnet 62. Furthermore, in certain embodiments, the first choke trim 30 may include other components, such as an additional external wear sleeve.

As described in detail above, present embodiments are directed toward the choke valve 14, which includes the choke body 20 that may individually retain and support each of the plurality of choke trims 22 described above. More specifically, the same choke valve 14 may retain and support the first choke trim 30 (e.g., a drilling or clean-up trim), the second choke trim 32 (e.g., a plug and cage or high capacity production choke trim), the third choke trim 34 (e.g., an external sleeve or low capacity production choke trim), or the fourth choke trim 36 (e.g., a silencer or labyrinth choke trim). To this end, each of the plurality of choke trims 22 may be similarly sized and dimensioned. For example, each of the plurality of choke trims may have a seat design or configuration configured to engage with the choke trim seat recess 66 of the choke body 20. Additionally, each of the plurality of choke trims 22 may be configured to be retained within the choke body 20 by the same bonnet 62. In certain embodiments, the choke trim 22 may be retained with additional retaining features, such as retaining pins 64. In other embodiments, the choke trim 22 may be sized such that a component of the choke trim 22 is directly retained by the bonnet 62.

In certain applications, existing choke trims 22 may be refinished or retrofitted to produce choke trims 22 with geometries and/or dimensions that may be suitable for existing choke bodies 20 (e.g., production choke bodies 20). For example, existing drilling choke trims 22 may be refitted or retrofitted to have dimensions that enable the retrofitted drilling choke trim 22 to fit within production choke bodies 20.

The interchangeability of each of the plurality of choke trims 22 with the same choke body 20 and bonnet 62 enables increased flexibility to change a style of choke trim 22 depending on flow condition without also changing the entire choke valve 14 assembly (e.g., the choke body 20 and the bonnet 62). As a result, other connections (e.g., to pipes, conduits, etc.) with the choke body 20 may be maintained while the choke trim 22 is exchanged for another choke trim 22. For example, the first choke trim 30 (e.g., the drilling choke trim) may be positioned within the choke body 20 to complete a well drilling process. Thereafter, the first choke trim 30 may be changed out for the second choke trim 32 or the third choke trim 34 (e.g., the production choke trims) once the drilling process is complete and in anticipation of a mineral production process. Indeed, this versatility may enable a mineral production team to complete a well drilling process instead of a third party drilling or well clean-up team, which may reduce costs incurred by an operator.

Moreover, during the production process, it may be desirable to perform additional well clean-up or other process (e.g., fracking) utilizing the first choke trim 30 (e.g., the drilling choke trim). In such circumstances, the second choke trim 32 or the third choke trim 34 (e.g., the production choke trims) may be changed out for the first choke trim 30 (e.g., the drilling choke trim) for completion of additional clean-up or fracking of the well without removing and changing out the choke body 20 and other components of the choke valve 14. As will be appreciated, the ability to simply change out the choke trim 22 for another choke trim 22 without changing out the entire choke valve 14 assembly may reduce costs, streamline operations, and generally improve efficiency.

The interchangeability of each of the plurality of choke trims 22 with the same choke body 20 and bonnet 62 also enables an operator to readily change out choke trims 22 in other circumstances. For example, choke trims 22 may become worn, eroded, blocked, or otherwise damaged during use. The ability of an operator to readily replace any of the plurality of choke trims 22 with any other of the plurality of choke trims 22 without replacing the choke body 20, the bonnet 62, and other components of the choke valve 14 may reduce operational downtime of the fluid handling system 10.

While the present embodiments may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is to cover all modifications, equivalents, and alternatives falling within the spirit and scope of the present disclosure as defined by the following appended claims.

The invention claimed is:

1. A choke valve system, comprising:
    a choke valve body having a chamber;
    a bonnet configured to couple with the choke valve body; and
    a plurality of choke trims, wherein the plurality of choke trims are different choke trim types,
    wherein each of the plurality of choke trims is configured to be mutually exclusively secured within the chamber in the choke valve body, and the bonnet closes an opening over the chamber and secures one of the plurality of choke trims in the chamber.

2. The choke valve system of claim 1, wherein the different choke trim types of the plurality of choke trims, comprise:
    a plug and cage choke trim;
    an external sleeve choke trim; and
    a drilling choke trim, wherein the drilling choke trim is configured to enable a larger particle tolerance than the plug and cage choke trim and the external sleeve choke trim.

3. The choke valve system of claim 1, wherein the bonnet is coupled to the choke valve body with a plurality of fasteners.

4. The choke valve system of claim 3, wherein the plurality fasteners are oriented along an axis of the choke valve body.

5. The choke valve system of claim 1, wherein at least one of the plurality of choke trims is configured to be retained between a choke trim seat recess and the bonnet with at least one additional retaining feature.

6. The choke valve system of claim 5, wherein the additional retaining feature comprises one or more retaining elements positioned between the bonnet and the at least one of the plurality of choke trims.

7. The choke valve system of claim 1, wherein each of the plurality of choke trims has approximately the same overall length and approximately the same outer diameter.

8. The choke valve system of claim 1, wherein the choke valve body comprises a production choke body designed for production choke trims.

9. The choke valve system of claim 1, comprising an actuator configured to adjust a position of the one of the plurality of choke trims secured in the chamber.

10. The choke valve system of claim 9, comprising a controller communicatively coupled to the actuator, wherein the controller is configured to control the actuator to adjust a flow by adjusting the position of the one of the plurality of choke trims based on an identified type of the one of the plurality of choke trims positioned within the choke valve body.

11. The choke valve system of claim 10, wherein the controller is configured to regulate operation of the actuator based on a type of additional equipment being used with the choke valve system, based on operating conditions of a fluid-handling system having the choke valve system, or a combination thereof.

12. The choke valve system of claim 1, wherein at least one trim of the plurality of choke trims is configured to be secured within the choke valve body with an axial end of the at least one trim disposed axially against a choke trim seat recess.

13. The choke valve system of claim 12, wherein the at least one trim of the plurality of choke trims is configured to be secured within the choke valve body with a first portion of the at least one trim disposed axially against the choke trim seat recess and a second portion of the at least one trim extending axially into a central bore of the choke valve body beyond the choke trim seat recess.

14. The choke valve system of claim 1, wherein at least one trim of the plurality of choke trims comprises an outer member disposed about an inner member along an axis, and the inner member extends at least axially to or beyond an axial end of the outer member.

15. The choke valve system of claim 14, wherein the inner member comprises a plug and the outer member comprises an outer sleeve or outer cage.

16. The choke valve system of claim 14, wherein the inner member comprises an inner sleeve or inner cage and the outer member comprises an outer sleeve or outer cage.

17. The choke valve system of claim 1, wherein one of the different choke trim types of the plurality of choke trims comprises a silencer or labyrinth choke trim.

18. The choke valve system of claim 1, wherein at least part of each trim of the plurality of choke trims is configured to be directly retained by the bonnet.

19. The choke valve system of claim 1, wherein the bonnet is configured to be fastened to a side wall of the choke valve body.

20. The choke valve system of claim 1, wherein the bonnet is configured to couple with the choke valve body after the one of the plurality of choke trims is installed within the choke valve body.

21. The choke valve system of claim 1, comprising a shaft extending through the bonnet to the one of the plurality of choke trims mutually exclusively secured within the choke valve body, wherein a manual actuator is coupled to the shaft.

22. The choke valve system of claim 1, wherein a first one of the plurality of choke trims terminates at an axial end that abuts axially against a choke trim seat recess when installed in the chamber in the choke valve body, and a second one of the plurality of choke trims has a first portion disposed axially against the choke trim seat recess and a second portion extending axially into a central bore of the choke valve body beyond the choke trim seat recess when installed in the chamber in the choke valve body.

23. A choke valve system, comprising:
a choke valve body;
a plurality of choke trims, comprising at least two of:
 a plug and cage choke trim;
 an external sleeve choke trim; or
 a drilling choke trim, wherein the drilling choke trim is configured to enable a larger particle tolerance than the plug and cage choke trim and the external sleeve choke trim,
wherein each of the plurality of choke trims is configured to be mutually exclusively secured within the choke valve body;
an actuator configured to adjust a flow by adjusting a position of one choke trim of the plurality of choke trims mutually exclusively secured within the choke valve body; and
a controller communicatively coupled to the actuator, wherein the controller is configured to control the actuator to adjust the flow by adjusting the position of the one choke trim based on an identified type of the one choke trim positioned within the choke valve body.

24. A choke valve system, comprising:
a choke valve body;
an opening in the choke valve body, wherein the opening is configured to mutually exclusively support one of a plurality of choke trims, comprising:
 a first choke trim;
 a second choke trim; and
 a third choke trim, wherein the first, second, and third choke trims are different types of choke trims, wherein the first, second, and third choke trims have different particle tolerances;
an actuator configured to adjust a flow by adjusting a position of one choke trim of the plurality of choke trims mutually exclusively secured within the choke valve body; and
a controller communicatively coupled to the actuator, wherein the controller is configured to control the actuator to adjust the flow by adjusting the position of the one choke trim based on an identified type of the one choke trim positioned within the choke valve body, wherein the identified type is one of the different types of choke trims.

25. A choke valve system, comprising:
a choke valve body having a chamber; and
a plurality of choke trims, wherein the plurality of choke trims are different choke trim types,
wherein the choke valve body and the plurality of choke trims are designed to enable each of the different choke trim types of the plurality of choke trims to be mutually exclusively secured within the chamber in the choke valve body.

* * * * *